(12) United States Patent
Zhao et al.

(10) Patent No.: US 8,194,650 B2
(45) Date of Patent: Jun. 5, 2012

(54) METHOD FOR ESTABLISHING THE IP FLOW MAP UPDATING CONNECTION IN A HIGH RATE PACKET DATA NETWORK

(75) Inventors: Xiaowu Zhao, Shenzhen (CN); Dong Wei, Shenzhen (CN)

(73) Assignee: ZTE Corporation (CN)

( * ) Notice: Subject to any disclaimer, the term of this patent is extended or adjusted under 35 U.S.C. 154(b) by 263 days.

(21) Appl. No.: 12/672,588

(22) PCT Filed: Jan. 2, 2008

(86) PCT No.: PCT/CN2008/000002
§ 371 (c)(1),
(2), (4) Date: Feb. 8, 2010

(87) PCT Pub. No.: WO2009/024003
PCT Pub. Date: Feb. 26, 2009

(65) Prior Publication Data
US 2012/0002667 A1 Jan. 5, 2012

(30) Foreign Application Priority Data

Aug. 23, 2007 (CN) .......................... 2007 1 0147517

(51) Int. Cl.
*H04L 12/66* (2006.01)
(52) U.S. Cl. ........................................ 370/355; 370/351
(58) Field of Classification Search .......... 370/351–355
See application file for complete search history.

(56) References Cited

U.S. PATENT DOCUMENTS

| 6,894,994 | B1 * | 5/2005 | Grob et al. | 370/335 |
| 7,747,221 | B2 * | 6/2010 | Lee | 455/63.1 |
| 7,773,947 | B2 | 8/2010 | Gerlach | |
| 2008/0304510 | A1 * | 12/2008 | Qu | 370/463 |

FOREIGN PATENT DOCUMENTS

| CN | 1342005 A | 3/2002 |
| CN | 1572089 | 1/2005 |
| JP | 2002124961 A | 4/2002 |
| JP | 2006033826 A | 2/2006 |
| KR | 10 2004 0088844 A | 4/2003 |
| KR | 10 2004 0048149 B1 | 6/2004 |
| WO | 2006011337 A1 | 2/2006 |

* cited by examiner

*Primary Examiner* — Phuc Tran
(74) *Attorney, Agent, or Firm* — Brooks Kushman P.C.

(57) ABSTRACT

The present invention discloses a method for establishing connections in IP flow mapping update in a HRPD network, comprising steps of: (1) when a PCF receives a request for establishing A8 connections that need to be re-mapped, if determining that there is A8 connection supported, sending an A11-registration request to a PDSN; (2) when the PDSN receives the information on A10 connections in the A11-registration request, if determining that there is A10 connection supported, establishing those A10 connections and sending an A11-registration reply; (3) when the PCF receives the reply message, establishing all the A8 connections corresponding to the A10 connections and sending an A9-connect-A8 to the AN; (4) an AT and the AN releasing and removing the IP flow that can not be mapped to any of the A8 connections or resource reserved by the IP flow according to the A9-connect-A8 received.

13 Claims, 2 Drawing Sheets

METHOD FOR ESTABLISHING THE IP FLOW MAP UPDATING CONNECTION IN A HIGH RATE PACKET DATA NETWORK

TECHNICAL FIELD

The invention relates to mobile communication, and more particularly, to a method for establishing connections in IP flow mapping update in a high rate packet data (HRPD) network.

BACKGROUND OF THE RELATED ART

At present, in access network technology for high rate packet data (HRPD) network, each interface in a network structure model shown in FIG. 1 is defined as follows: A1 interface carries signaling information between a call control and mobility management functions of the circuit-switched mobile switching center (MSC) and an IWS function in the access network (AN) 2; A1p interface carries signaling information between the call control and mobility management functions of the mobile switching center emulator (MSCe) and the IWS function in the AN; A8 interface carries user data between the access network (AN) 2 and a packet control function (PCF) 3; A9 interface carries signaling information between the AN and the PCF; A10 interface carries user data between the PCF and a packet data service node (PDSN) 4; A11 interface carries signaling information between the PCF 3 and the PDSN 4; A12 carries signaling information related to access authentication between the SC/MM function in the AN and the access network authentication authorization accounting (AN-AAA) entity; and A13 interface carries signaling information between the SC/MM function in the target AN and the SC/MM function in a source AN; wherein the IWS refers to a logical function of interworking solution, and the SC/MM refers to a logical function of session control/mobility management. IP flows between an access terminal (AT) 1 and the access network (AN) 2 may be reconfigured and cause update of IP flow mapping due to the following factors: ① addition or deletion of the IP flows, ② change of the Quality of Service (QoS) granted to the IP flows, and ③ re-mapping of the IP flows according to the radio link protocol (RLP). And the IP flow mapping update will results in: ① establishment of new service connections, ② release of existing service connections, ③ no change of the current service connections (that is, the service connections is neither increased nor decreased).

In regard to the case in which the IP flow mapping update results in establishment of new service connections, the prior art provides a procedure as shown in FIG. 2, comprising the following steps:

a. An AT and AN perform session configuration for IP flows, and the AN maps new IP flows or re-activated IP flows to new service connections.

b. If the AN considers that A8/A10 connections need to be established, the AN sends an A9-setup-A8 message to the PCF to establish the A8 connections and starts a timer TA8-setup. The A9-setup-A8 message includes an A8 traffic identifier corresponding to a main service connection and additional A8 traffic identifiers corresponding to auxiliary A8 connections. All the A8 connections that need to be established (including connections that have been established and will be established) are contained in the A9-setup-A8 message. The A8 connections that are about to be released are not contained in the A9-setup-A8 message.

c. The PCF sends an A11-registration request message to establish the A10 connections. The PCF starts a timer Tregreq. The A11-registration request message includes a session specific extension information element corresponding to the main connection as well as additional session information corresponding to the auxiliary connections contained in normal vendor/organization specific extension (NVSE) information elements. The A11-registration request message sent by the PCF contains information about all the A10 connections corresponding to the A8 connections received in the step b.

d. A PDSN adds the new A10 connections and sends an A11-registration reply message to the PCF; the PCT stops the timer Tregreq after receiving the reply message. The A11-registration reply message includes the session specific extension information element corresponding to the main connection as well as the additional session information corresponding to the auxiliary connections contained in the NVSEs. The A11-registration reply message sent by the PDSN contains information about all the A10 connections received in the step c. The PDSN and the PCF release those A10 connections of which relevant information is not contained in the reply message.

e. The PCF adds the new A8 connections and sends an A9-connect-A8 message to the AN. The AN stops the timer TA8-setup. The A9-connect-A8 message includes the A8 service identifier corresponding to the main connection and the additional A8 service identifiers corresponding to the auxiliary A8 connections. The A9-connect-A8 message contains information about all the A8 connections received in the step b. The PCF and the AN release those A8 connections of which relevant information is not contained in the A9-connect-A8 message.

It can be seen from the above procedure that it only relates to the case where the PCF and the PDSN accept the newly added service connections unconditionally. However, in an actual network, for some reasons of the PCF and the PDSN themselves or some policies of an operator executed by the PDSN, a request for establishing newly added service connections can not be accepted totally.

SUMMARY OF THE INVENTION

The technical problem to be solved by the present invention is to provide a method for establishing connections in IP flow mapping update in a HRPD network, which is able to reject or partially reject a request for establishing newly added service connections according to actual network conditions.

In order to solve the above technical problem, the present invention discloses a method for establishing connections in internet protocol (IP) flow mapping update in a high rate packet data network, comprising steps of:

(1) when a packet control function (PCF) receives a request for establishing all A8 connections that need to be re-mapped sent by an access network (AN), if determining that there is at least one A8 connection supported by the PCF, sending an A11-registration request message to a packet data service node (PDSN), the A11-registration request message carrying information about A10 connections corresponding to the A8 connections supported by the PCF;

(2) when the PDSN obtains the information about all the A10 connections in the A11-registration request message, if determining that there is at least one A10 connection supported by the PDSN, establishing those A10 connections and sending an A11-registration reply message carrying information about the established A10 connections to the PCF;

(3) when the PCF receives the A11-registration reply message, establishing all the A8 connections corresponding to the A10 connections in the A11-registration reply message, and sending an A9-connect-A8 message carrying information about the established A8 connections to the AN; and (4) an access terminal (AT) and the AN releasing and removing the IP flow that can not be mapped to any of the A8 connections or resource reserved by the IP flow according to the A9-connect-A8 message received.

The method may further comprise the following steps before the step (1):

A: the AT and AN performing session configuration for IP flows, and the AN mapping new IP flows or IP flows to new service connections; and B: the AN sending an A8-setup-A9 message to the PCF, the A8-setup-A9 message carrying information about all the A8 connections that need to be re-mapped.

Moreover, the method may further comprise:

in the step (2), if the PDSN determines that all the A10 connections requested to be established in the A11-registration request message can be supported by the PDSN, sending an A11-registration reply message with a code value of "registration accepted" to the PCF.

Moreover, the method may further comprise:

in the step (2), if the PDSN determines that parts of the A10 connections requested to be established in the A11-registration request message can be supported by the PDSN, sending an A11-registration reply message with a code value of "partial connections establishment" to the PCF, then the PDSN and PCF releasing those A10 connections not contained in the A11-registration reply message.

Moreover, the information about all the A10 connections in the A11-registration request message comprises a session specific extension information element corresponding to a main connection and additional session information corresponding to auxiliary connections supported by the PCF and contained in normal vendor/organization specific extension information elements (NVSEs); and information about all the A10 connections in the A11-registration reply message comprises the session specific extension information element corresponding to the main connection and additional session information corresponding to the auxiliary connections supported by the PDSN and contained in the NVSEs.

Moreover, the method is applied in a process in which the IP flow mapping update between an AT and AN leads to establishment of new service connections.

Moreover, the support by the PCF or PDSN refers to a capability of establishing A8 or A10 connections by the PCF or PDSN under a condition of permission by network resources.

Moreover, the establishment of A8 connections by the PCF refers to establishment of new A8 connections and/or preservation of existing A8 connections by the PCF; and the establishment of A10 connections by the PDSN refers to establishment of new A10 connections and/or preservation of existing A10 connections by the PDSN.

The present invention further provides a method for establishing connections in interne protocol (IP) flow mapping update in a high rate packet data network, comprising steps of:

A: when a packet control function (PCF) receives a request for establishing all A8 connections that need to be re-mapped sent by an access network (AN), if determining that there is at least one A8 connection supported by the PCF, sending an A11-registration request message carrying information about A10 connections corresponding to the A8 connections supported by the PCF to a packet data service node (PDSN);

B: the PDSN determining whether there are any A10 connections supported by the PDSN among all the A10 connections requested to be established in the A11-registration request message, and if no, sending an A11-registration reply message carrying information of "registration denied—insufficient resources" to the PCF, then the PDSN and PCF releasing all the A10 connections of an access terminal (AT); and C: when the PCF receives the A11-registration reply message, sending an A9-release-A8 completion message to the AN, then the PCF and AN releasing all the A8 connections of the AT, and the AT and AN releasing air connections in the high rate packet data network.

Moreover, the method may further comprise:

in the step A, the PCF determining whether there are any A8 connections supported by the PCF among all the A8 connections that need to be re-mapped in the request, and if no, sending an A11-registration request message carrying a "lifetime" being zero to the PDSN; and in the step B, when the PDSN receives the A11-registration request message carrying a "lifetime" being zero, sending an A11-registration reply message carrying a code value of "registration accepted" to the PCF.

Moreover, the method may further comprise:

when the PCF receives the A11-registration reply message, sending an A9-release-A8 completion message carrying information of "insufficient resources in PCF" to the AN.

Moreover, in the step C, the A9-release-A8 completion message carries information of "insufficient resources in PDSN".

The method for establishing connections in IP flow mapping update in a HRPD network provided by the present invention enables a PCF and PDSN to accept, reject, or partially reject a request for establishing newly added service connections through judgment based on actual conditions of the network, and specifically, ① to establish parts of the connections that can be supported, or ② to reject establishment of the connections. Compared with the prior art, the method improves and resolves the specific processing in the case that the resources of the PCF/PDSN is insufficient, and is evidently instructive for such practical problems in actual networks.

PREFERRED EMBODIMENTS OF THE INVENTION

The main conception of the present invention is: in regard to the scenario in which new service connections need to be established in IP flow mapping update, a PCF or PDSN performs two types of operations according to situations such as network resources of it, namely (1) the PCF/PDSN accepts establishment of parts of the connections (including enhancement and specification of functions of the messages in the procedure); (2) the PCF/PDSN rejects establishment of the connections (including enhancement and specification of functions of the messages in the procedure).

Technical schemes used in the present invention will be further described in detail below in conjunction with the accompanying drawings and specific embodiments.

Figure 1:
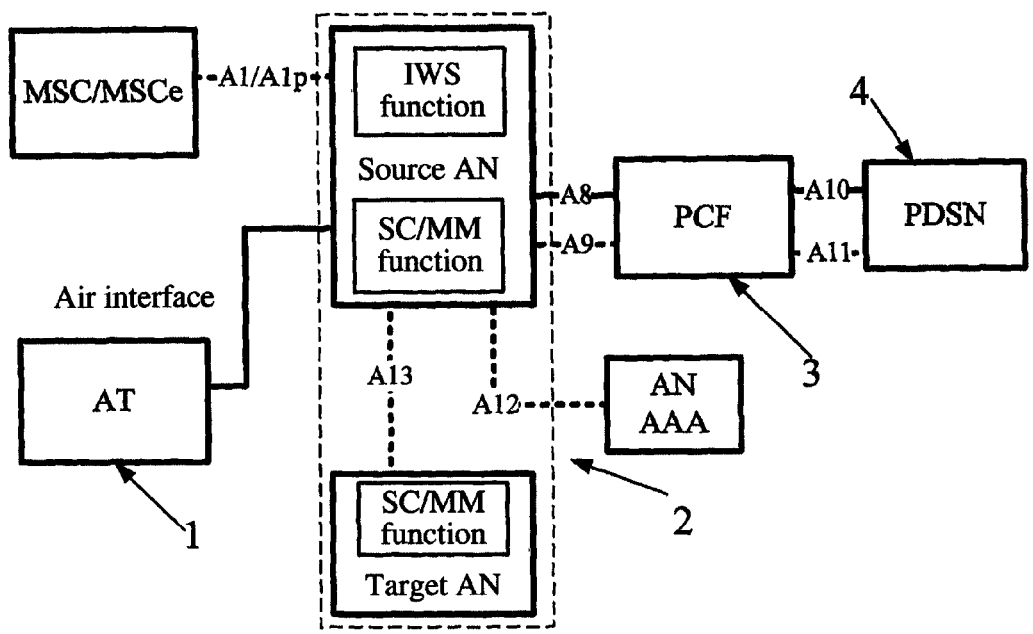
FIG. 1 is a schematic diagram illustrating a structure of a HRPD network.
Figure 2:
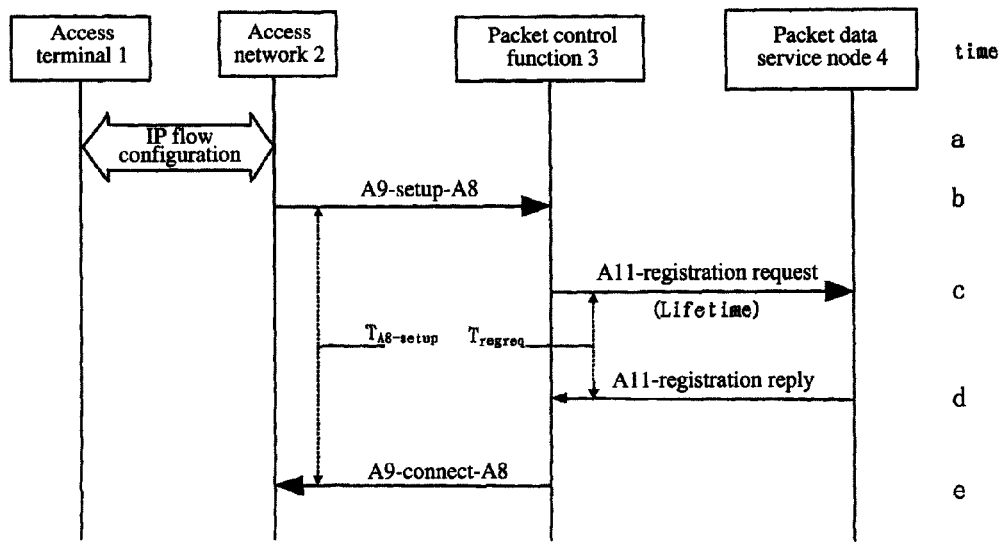
FIG. 2 is a flow chart of establishing new service connections in IP flow mapping update in the prior art.
Figure 3:
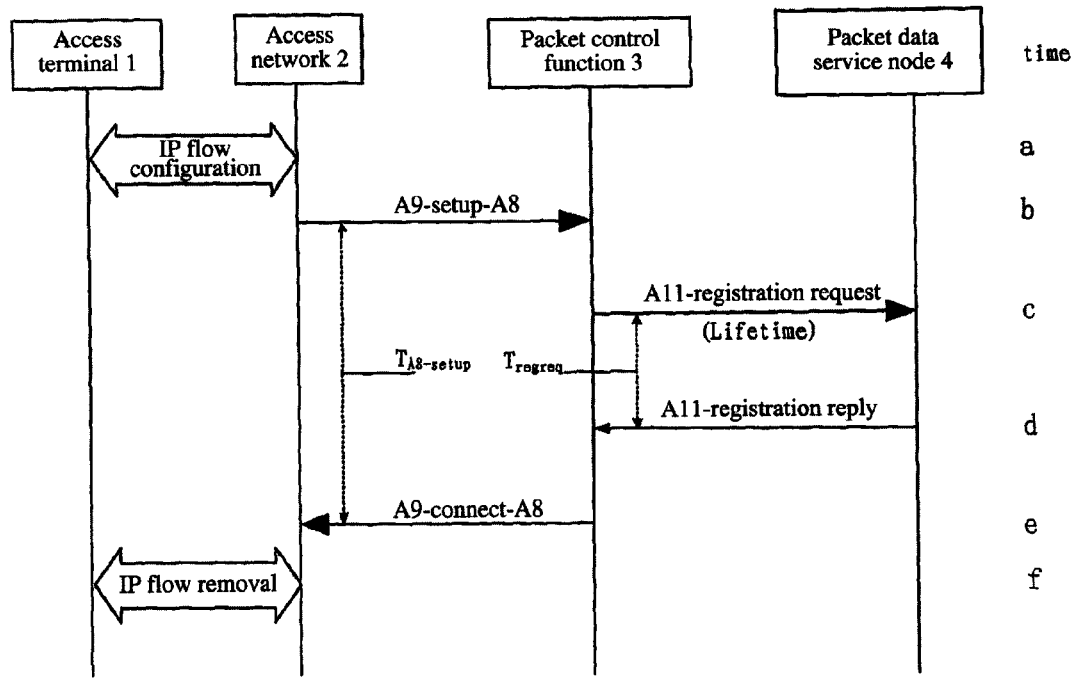
FIG. 3 is a flow chart of establishing partial connections in IP flow mapping update in accordance with the present invention.

The IF flow mapping update process in which a PCF/PDSN accepts establishment of partial connections comprises the following steps as shown in FIG. 3:

a. An AT and AN performs session configuration for IP flows, and the AN maps new IP flows or re-activated IP flows to new service connections.

b. If the AN considers that A8/A10 connections need to be established, the AN sends an A9-setup-A8 message to a PCF to establish the A8 connections and starts a timer TA8-setup. The A9-setup-A8 message includes an A8 service identifier corresponding to a main connection and additional A8 service identifiers corresponding to auxiliary A8 connections. The A9-setup-A8 message contains all the A8 connections that need to be re-mapped (including connections that have been established and will be established). The A8 connections that are about to be released are not contained in the A9-setup-A8 message.

In this step, there is a one-to-one corresponding relationship between the A8 and A10 connections.

c. The PCF determinates that there is at least one A8 connection supported by the PCF among all the A8 connections that need to be re-mapped in the A9-setup-A8 message, then sends an A11-registration request message to a PDSN to setup the A10 connections corresponding to the A8 connections that need to be re-mapped and are supported by the PCF. The PCF starts a timer Tregreq. Wherein, the A11-registration request message includes a session specific extension information element corresponding to the main connection as well as additional session information corresponding to the auxiliary connections contained in NVSEs and supported by the PCF. The A11-registration request message sent by the PCF further includes information about the A10 connections corresponding to the auxiliary connections supported by the PCF.

d. The PDSN determines whether there are any A10 connections supported by the PDSN among the A10 connections requested to be established in the A11-registration request message, and if yes, establishes those A10 connections, and sends an A11-registration reply message carrying information about those A10 connections to the PCF; the PCF stops the timer Tregreq after receiving the reply message. Wherein, the A11-registration reply message includes the session specific extension information element corresponding to the main connection and the additional session information corresponding to the auxiliary connections contained in the NVSEs.

If the PDSN supports all the A10 connections requested to be established in the A11-registration request message, then the A11-registration reply message includes information about all the A10 connections requested to be established in the A11-registration request message and a code value of "registration accepted". And if the PDSN supports only parts of the A10 connections requested to be established in the A11-registration request message, then the A11-registration reply message includes information about the partial A10 connections supported by the PDSN and a code value of "partial connections establishment". Meanwhile, the PDSN and the PCF release those A10 connections not contained in the reply message.

e. After receiving the A11-registration reply message, the PCF establishes the A8 connections corresponding to the A10 connections, supported by the PDSN, in the reply message, and sends an A9-connect-A8 message carrying information about the established A8 connections to the AN. The AN stops the timer TA8-setup. Wherein, the A9-connect-A8 message includes the A8 service identifier corresponding to the main connection and the additional A8 service identifiers corresponding to the auxiliary A8 connections. The PCF and the AN release those A10 connections not contained in the message.

f. The IP flow that can not be mapped to any A8 connection or the resource reserved by it between the AT and the AN is removed based on the A9-connect-A8 message.

The acceptance procedure in which new service connections need to be established during IP flow mapping update is described herein. When the IP flows are re-mapped, an existing service connection may be abolished and released. In the acceptance procedure, the PCF and/or the PDSN can only partially satisfy the requirements for establishing new service connections due to problems relating to resources of them.

In the method described above, establishment of A8 or A10 connections refers to adding A8 or A10 connections and/or preserving existing A8 or A10 connections, and the established service connections are only the connections supported by the PCF or PDSN. Wherein, the support by the PCF or the PDSN refers to the capability of establishing A8 or A10 connections by the PCF or the PDSN under the condition of permission by network resources, and the number of the established connections is less than or equal to the number of the connections requested to be established.

Figure 4:
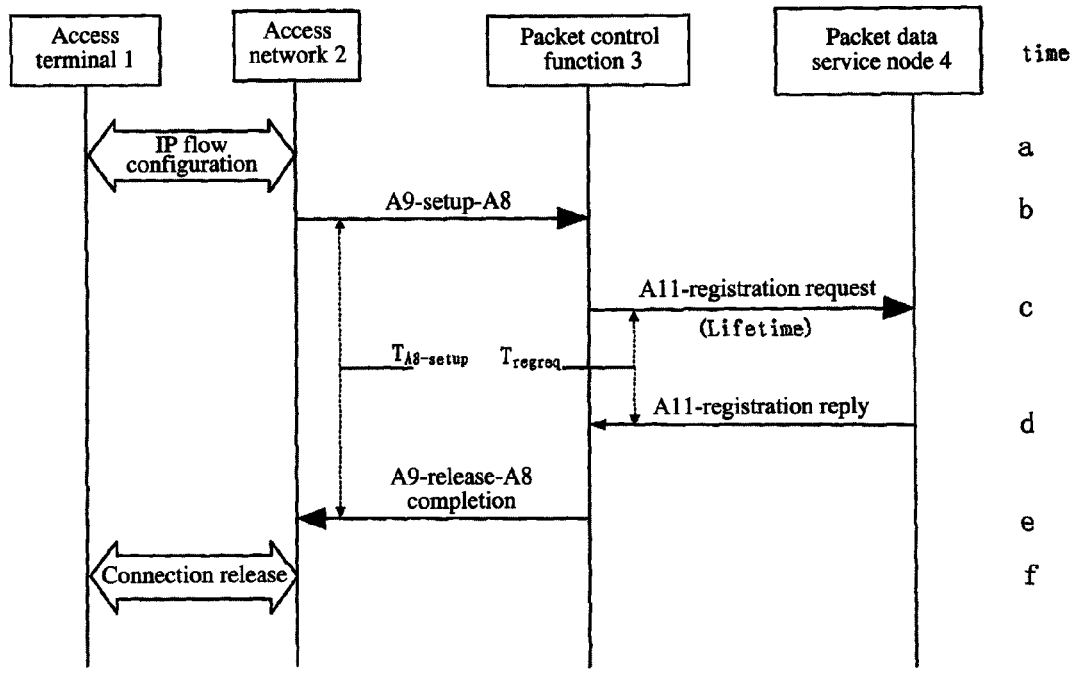
FIG. 4 is a flow chart of a PCF/PDSN rejecting establishment of connections in IP flow mapping update in accordance with the present invention.

The IP flow mapping update process in which a PCF/PDSN rejects establishment of service connections comprises the following steps as shown in FIG. 4:

a. An AT and AN perform session configuration for IP flows, and the AN maps New IP flows or re-activated IP flows to new service connections.

b. When the AN considers that A8/A10 connections need to be established, it sends an A9-setup-A8 message to a PCF to establish the A8 connections and starts a timer TA8-setup. The A9-setup-A8 message includes an A8 service identifier corresponding to a main connection and additional A8 service identifiers corresponding to auxiliary A8 connections. The A9-setup-A8 message contains all the A8 connections that need to be re-mapped (including connections that have been established and will be established). The A8 connections that are about to be released are not contained in the A9-setup-A8 message.

In this step, there is a one-to-one corresponding relationship between the A8 and A10 connections.

c. The PCF determinates whether there are any A8 connections supported by the PCF among all the A8 connections that need to be re-mapped in the A9-setup-A8 message, and then sends an A11-registration request message to the PDSN. The PCF starts a timer Tregreq.

In this step, if the PCF determinates that there is at least one A8 connection supported by the PCF among all the A8 connections that need to be re-mapped in the A9-setup-A8 message, then the A11-registration request message sent by the PCF to the PDSN includes a session specific extension information element corresponding to the main connection and additional session information corresponding to the auxiliary connections contained in NVSEs and supported by the PCF. The A11-registration request message sent by the PCF further includes information about the A10 connections corresponding to the auxiliary connections supported by the PCF.

If the PCF rejects establishment of any service connection, then the A11-registration request message sent by the PCT to the PDSN contains a "lifetime" being zero so that all the connections will be released.

d. The PDSN rejects all the A10 connections, or sends an A11-registration reply message to the PCF when receiving the A11-registration request message containing a "lifetime" being zero; the PCF stops the timer Tregreq after receiving the reply message. The PDSN and the PCF release all the A10 connections related to the AT.

In this step, if the PDSN rejects establishment of all the A10 connections, the A11-registration reply message contains a code value of "registration denied—insufficient resources". And if the A11-registration request message received by the PDSN contains a "lifetime" being zero, the A11-registration reply message contains a code value of "registration accepted".

e. After receiving the A11-registration reply message carrying a code value of "registration accepted" or "registration denied—insufficient resources", the PCF sends an A9-release-A8 completion message to the AN, and the message carries "insufficient resources in PCF" (if the received A11-registration reply message carries "registration accepted", i.e., the PCF decides by itself to reject the establishment) or "insufficient resources in PDSN" (if the received A11-registration reply message carries "registration denied—insufficient resources"). The AN stops the timer TA8-setup. The PCF and the AN release all the A8 connections related to the AT.

f. Air connections between the AT and the AN are shut down based on the A9-release-A8 completion message.

The rejection procedure in which new service connections need to be established during IP flow mapping update is described herein. In the rejection procedure, the PCF and/or the PDSN reject establishment of new service connections due to problems relating to resources of them or other factors.

Industrial Applicability

The present invention provides a method for establishing connections in IP flow mapping update in a HRPD network in order to reject or partially reject a request for establishing newly added service connections according to actual conditions of the network.

What we claim is:

1. A method for establishing connections in internet protocol (IP) flow mapping update in a high rate packet data network, comprising steps of:
    (1) when a packet control function (PCF) receives a request for establishing all A8 connections that need to be re-mapped sent by an access network (AN), if determining that there is at least one A8 connection supported by the PCF, sending an A11-registration request message to a packet data service node (PDSN), the A11-registration request message carrying information about A10 connections corresponding to the A8 connections supported by the PCF;
    (2) when the PDSN obtains the information about all the A10 connections in the A11-registration request message, if determining that there is at least one A10 connection supported by the PDSN, establishing those A10 connections and sending an A11-registration reply message carrying information about the established A10 connections to the PCF;
    (3) when the PCF receives the A11-registration reply message, establishing all the A8 connections corresponding to the A10 connections in the A11-registration reply message, and sending an A9-connect-A8 message carrying information about the established A8 connections to the AN; and
    (4) an access terminal (AT) and the AN releasing and removing the IP flow that can not be mapped to any of the A8 connections or resource reserved by the IP flow according to the A9-connect-A8 message received.

2. The method according to claim 1, further comprising the following steps before the step (1):
    A: the AT and AN performing session configuration for IP flows, and the AN mapping new IP flows or re-activated IP flows to new service connections; and
    B: the AN sending an A8-setup-A9 message to the PCF, the A8-setup-A9 message carrying information about all the A8 connections that need to be re-mapped.

3. The method according to claim 1, further comprising:
    in the step (2), if the PDSN determines that all the A10 connections requested to be established in the A11-registration request message can be supported by the PDSN, sending an A11-registration reply message with a code value of "registration accepted" to the PCF.

4. The method according to claim 1, further comprising:
    in the step (2), if the PDSN determines that parts of the A10 connections requested to be established in the A11-registration request message can be supported by the PDSN, sending an A11-registration reply message with a code value of "partial connections establishment" to the PCF, then the PDSN and PCF releasing those A10 connections not contained in the A11-registration reply message.

5. The method according to claim 1, wherein,
    the information about all the A10 connections in the A11-registration request message comprises a session specific extension information element corresponding to a main connection and additional session information corresponding to auxiliary connections supported by the PCF and contained in normal vendor/organization specific extension information elements (NVSEs); and
    information about all the A10 connections in the A11-registration reply message comprises the session specific extension information element corresponding to the main connection and additional session information corresponding to the auxiliary connections supported by the PDSN and contained in the NVSEs.

6. The method according to claim 1, wherein the method is applied in a process in which the IP flow mapping update between an AT and AN leads to establishment of new service connections.

7. The method according to claim 1, wherein,
    the support by the PCF or PDSN refers to a capability of establishing A8 or A10 connections by the PCF or PDSN under a condition of permission by network resources.

8. The method according to claim 7, wherein,
    the setup of A8 connections by the PCF refers to setup of new A8 connections and/or preservation of existing A8 connections by the PCF; and
    the setup of A10 connections by the PDSN refers to new A10 connections and/or preservation of existing A10 connections by the PDSN.

9. The method according to claim 1, wherein,
    the establishment of A8 connections by the PCF refers to establishment of new A8 connections and/or preservation of existing A8 connections by the PCF; and
    the establishment of A10 connections by the PDSN refers to establishment of new A10 connections and/or preservation of existing A10 connections by the PDSN.

10. A method for establishing connections in internet protocol (IP) flow mapping update in a high rate packet data network, comprising steps of:
    A: when a packet control function (PCF) receives a request for establishing all A8 connections that need to be re-mapped sent by an access network (AN), if determining that there is at least one A8 connection supported by the PCF, sending an A11-registration request message carrying information about A10 connections corresponding to the A8 connections supported by the PCF to a packet data service node (PDSN);

B: the PDSN determining whether there are any A10 connections supported by the PDSN among all the A10 connections requested to be established in the A11-registration request message, and if no, sending an A11-registration reply message carrying information of "registration denied—insufficient resources" to the PCF, then the PDSN and PCF releasing all the A10 connections of an access terminal (AT); and C: when the PCF receives the A11-registration reply message, sending an A9-release-A8 completion message to the AN, then the PCF and AN releasing all the A8 connections of the AT, and the AT and AN releasing air connections in the high rate packet data network.

11. The method according to claim 10, further comprising:
in the step A, the PCF determining whether there are any A8 connections supported by the PCF among all the A8 connections that need to be re-mapped in the request, and if no, sending an A11-registration request message carrying a "lifetime" being zero to the PDSN; and in the step B, when the PDSN receives the A11-registration request message carrying a "lifetime" being zero, sending an A11-registration reply message carrying a code value of "registration accepted" to the PCF.

12. The method according to claim 11, further comprising:
when the PCF receives the A11-registration reply message, sending an A9-release-A8 completion message carrying information of "insufficient resources in PCF" to the AN.

13. The method according to claim 10, wherein in the step C, the A9-release-A8 completion message carries information of "insufficient resources in PDSN".

* * * * *